Aug. 13, 1963  A. W. BLANSHINE  3,100,373
CONTROL DEVICE FOR ADJUSTING A HARVESTER PLATFORM
Filed May 15, 1961  2 Sheets-Sheet 2

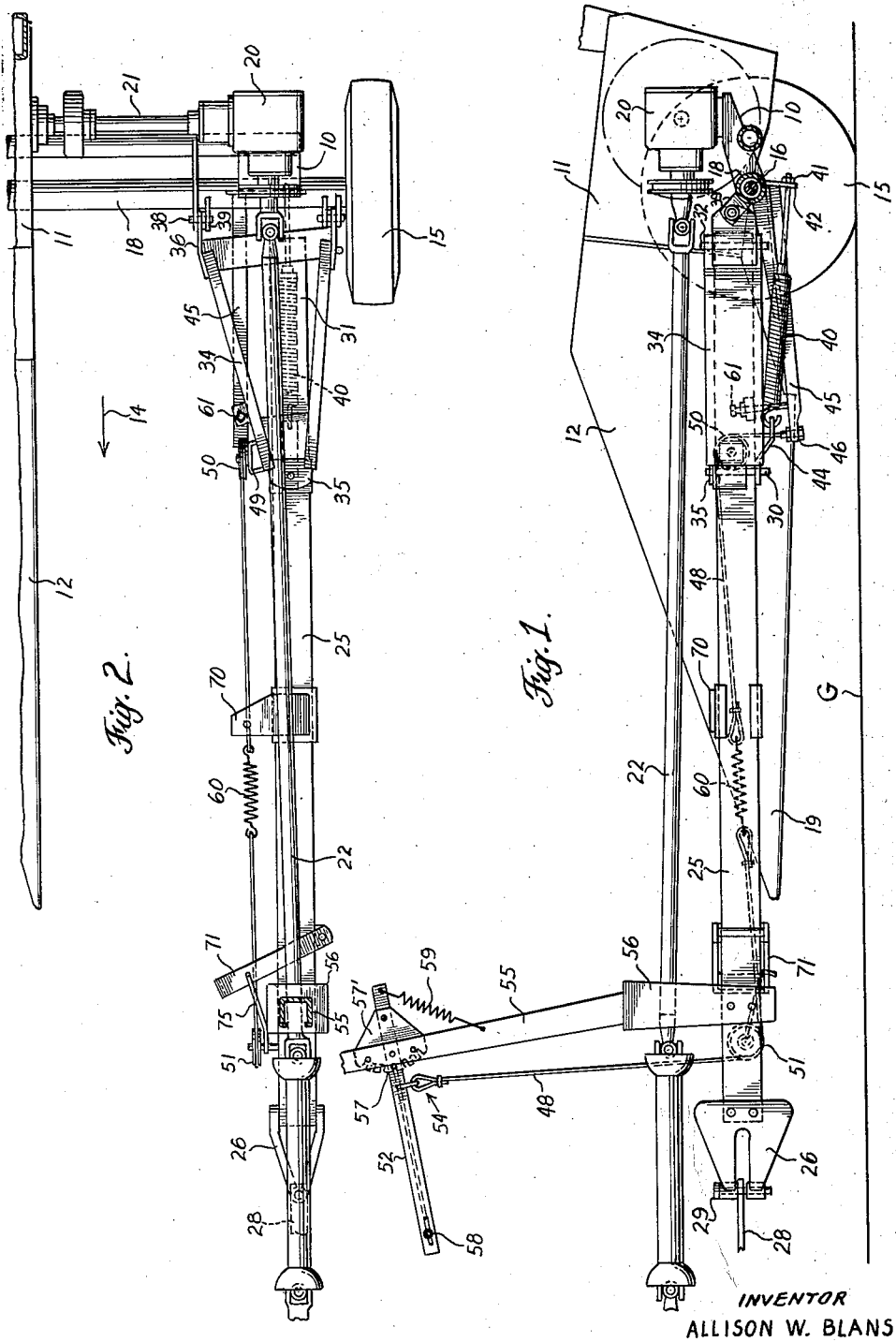

INVENTOR
ALLISON W. BLANSHINE
BY Joseph A. Brown
ATTORNEY

United States Patent Office 3,100,373
Patented Aug. 13, 1963

3,100,373
CONTROL DEVICE FOR ADJUSTING A
HARVESTER PLATFORM
Allison W. Blanshine, Lititz, Pa., assignor to Sperry Rand Corporation, New Holland, Pa., a corporation of Delaware
Filed May 15, 1961, Ser. No. 109,899
5 Claims. (Cl. 56—214)

This invention relates generally to agricultural implements and more particularly to an improved device for raising and lowering the forward end of a forage harvester relative to the ground.

It is common in certain types of forage harvesters and other implements to provide a unit mounted on a wheel supported frame, wherein the frame is pivotally connected to a tongue. The tongue is connectable to a tractor whereby the machine may be towed and operated. By pivoting the frame and tongue in one direction relative to each other, a forward end of the harvester can be raised, and by pivoting the frame and tongue in an opposite direction, the forward end can be lowered. Various devices have been provided heretofore for achieving such adjustment. Generally, an upstanding lever arrangement is used. While effective, such an arrangement takes up considerable space and impairs the appearance of the machine. Also, such structures render more difficult access to other components of the machine, thereby complicating repair problems.

Sometimes, control devices are provided which are manually operable; other times, hydraulically operable devices are used. Generally, provision is made for selective use of either mechanical or hydraulic means. However, the changeover from one to another is often relatively complicated.

One object of this invention is to provide an improved, simplified control device for a forage harvester of the character described whereby a forward end of the harvester may be raised and lowered relative to the ground.

Another object of this invention is to provide a control device of the character described which has few operative parts so located that they do not interfere with access to other components of the machine.

Another object of this invention is to provide a simplified, adjustable, resilient means of counterbalancing the excess weight of the forward portion of the machine so that an appropriate weight can be maintained between it and the ground.

Another object of this invention is to provide a control device of the character described which includes means which limits control movement in one direction and is adjustable whereby a limit point may be varied.

Another object of this invention is to provide a control device which permits the forward end of a harvester to float when the machine is in operation, having resilient means remote from the counterbalancing means for cushioning shock loads or the like resulting from such floating action.

Another object of this invention is to provide a control device whereby the operator stores energy in a manual lift lever spring during the stroke opposite to the lifting stroke, this stored spring energy being then available to help the operator lift the unit easily when this becomes necessary.

A further object of this invention is to provide a control device of the character described so constructed that a quick changeover is possible from manual to hydraulic control.

A still further object of this invention is to provide a control device having latch means cooperative with hydraulic means to hold a machine in a given adjusted position.

Other objects of this invention will be apparent hereinafter from the specification and from the recital in the appended claims.

In the drawings:

FIG. 2 is a plan view and part section of the device shown in FIG. 1;

FIG. 4 is a plan view and part section of the device shown in FIG. 3.

Figure 1:
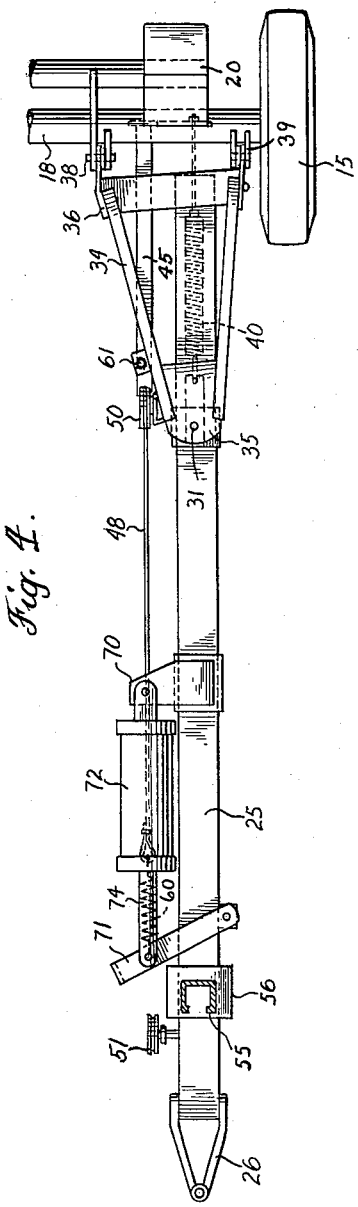
FIG. 1 is a part side elevation, part sectional view of a forage harvester having a control device constructed according to this invention, a row crop attachment of the harvester being shown in elevated position and a manually operable ratchet mechanism being shown for operating the device.

Referring now to the drawings by numerals of reference, and first to the embodiment of the invention shown in FIGS. 1 and 2, 10 denotes a frame structure on which a forage harvester 11 is fixedly mounted. The forage harvester includes a header or row crop attachment 12 which extends forwardly relative to the direction of travel of the machine indicated by the arrow 14 in FIG. 2. The frame 10 is supported for travel over the ground G by a pair of wheels one of which is shown at 15. The wheels are rotatable about a transverse axis of axle shaft 16, FIG. 1. Shaft 16 is surrounded by a rock-shaft 18 to which the frame 10 of harvester 11 or other implement is fixedly connected. As shown in FIG. 1, if the rock-shaft 18 is pivoted in a counterclockwise direction from the position shown in FIG. 1, the forward end 19 of the header 12 will be lowered. Conversely, if the rock-shaft 18 is pivoted in a clockwise direction, the forward end 19 will be raised.

Mounted on the frame 10 is a gear box 20 having an output shaft 21 to the harvester 11. Power is transmitted to the gear box 20 through a power assembly 22 which extends fore-and-aft along the left hand side of the machine, facing forwardly. The forward end of assembly 22 is adapted to be connected to the output shaft of the tractor, not shown, which tows the implement. For draft purposes, a tongue 25 is provided having a clevis 26 at its forward end connectable to the tractor drawbar 28 by hitch pin 29. The tongue 25 is box-like in cross section and extends rearwardly, being pivotally connected, intermediate its ends, to an A-frame 34 by a pivot pin 30. The rear end 31 of tongue 25 is adapted to be latched to the frame 10 by a pin 32. As is conventional, the tongue 25 is laterally shiftable relative to the frame 10 between an inboard transport position and an outboard operative position. The particular outboard position depends upon the particular header unit used on the implement.

A-frame 34 has forward brackets 35 which provide for the pivotal connection 30 and rearward brackets 36 for transverse pivot pins 38. The pins 38 interconnect brackets 36 and fixed legs 39 extending radially from rock-shaft 18. Pivotal movement of rock-shaft 18 changes the relative position of tongue 25 and frame 10 and thereby the relative position of the header 12 and the ground G. Such structure is substantially conventional and therefore will not be described in greater detail here.

The device or mechanism for rotating rock-shaft 18 includes a counterbalance spring 40 conventionally universally connected at 41 to depending leg 42 affixed to the rock-shaft. The forward end of the spring 40 is connected to a bracket member 44 on the forward end of the A-frame 34. Spring 40 exerts a constant pulling force on leg 42 and thereby biases rock-shaft 18 to pivot in a clockwise direction (FIG. 1) to assist in raising the header 12. No such assistance is needed for pivoting the rock-shaft in a counterclockwise direction since the weight of the header 12 biases the rock-shaft in such direction. Spring 40 also provides means for regulating the pressure of header 12 on the ground when the machine is operating. This is essential to proper operation of the machine.

Fixedly connected to rock-shaft 18 and extending forwardly thereof is a lever 45 having a forward end 46 connected to a flexible control element or cable 48. Rotatably mounted above lever 45 on a bracket 49 is a support member in the form of pulley 50. The control cable 48 extends upwardly from lever 45 over pulley 50 and then forwardly. The cable extends around the second pulley 51 adjacent the forward end of tongue 25 and then upwardly to a control arm 52 of a conventional ratchet mechanism 54. Ratchet mechanism 54 is carried on a support stand 55 connected through member 56 to tongue 25.

The arm 52 is held in an adjusted position by a detent 57, cooperative with ratchet teeth of plate 57' of mechanism 54 and controlled by a suitable control handle 58. A spring 59 is interconnected between the arm 52 and the support stand 55, as shown in FIG. 1. When arm 52 is swung downwardly to lower header 12, spring 59 is extended and stores energy which is usable later to assist the operator when he lifts arm 52 to raise the header. When the arm 52 is pivoted relative to the stand 55 and lifted upwardly, control element or cable 48 is pulled and the lever 45 is lifted thereby causing rock-shaft 18 to pivot in a clockwise direction (FIG. 1). This raises the front end 19 of header 12. If the control handle 52 is released and lowered, the control cable 48 is slackened and lever 45 is pivoted by the weight of the header 12 in a counter-clockwise direction (FIG. 1) whereby the forward end 19 is lowered. At the same time spring 59 stores energy, as described.

When the implement is operating in the field, the header 12 floats up and down relative to the ground. This causes rock-shaft 18 to pivot slightly back and forth, which in turn causes the lift arm 45 to go up and down. Such movements produce shock loads which are transmitted through cable 48 to other structure. Normally, the load on cable 48 via lever 45 would render the cable solid. However, to minimize loads on the cable a resilient link in the form of a spring 60 is interposed between the ends of cable 48. Specifically, the spring 60 is located remote from frame 10 and counterbalance spring 40 between the support pulleys 50 and 51. It has been found that the use of such a spring greatly increases the operative life of the control device and its related components. Also, it acts as a shock absorber and reduces the floating action of header 12 thereby achieving a better harvesting action.

Mounted on A-frame 34 and extending downwardly therefrom is a stop member 61. The stop member is in a form of a threaded bolt the lower end of which is engageable with the forward end of the lever 45. Stop 61 limits upward movement of the lever 45. It thereby establishes the maximum pivoting movement of the rock-shaft 18 in one direction. This has several advantages. When the header 12 is removed, the center of gravity of the implement which formerly was forwardly of the transverse axis of the implement, is now shifted rearwardly. Thus, there is a tendency for the implement to pivot in a clockwise direction. Such pivoting movement is prevented by the engagement of the lever 45 with the stop 61. Further, when it is desired to properly position harvester 11 to receive a particular header unit, stop 61 may be used. The harvester unit 11 can be positioned as desired to receive the attaching elements of the header 12.

The counterbalance spring 40 and the spring 59 on the arm 52 greatly reduce the physical effort required to operate the ratchet mechanism to lift header 12. The spring 60 protects the structure employed from undesirable shocks when the implement is operating and smooths out floating tendencies.

Figure 3:
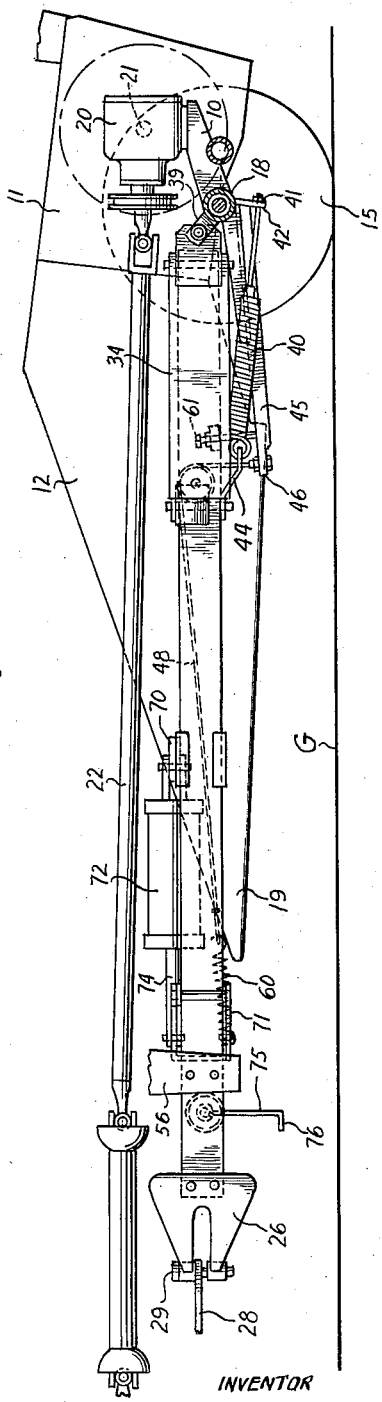
FIG. 3 is a view similar to FIG. 1 but showing a hydraulic means for operating the device and certain of the structure being removed to improve the showing of the relevant parts.

The control device shown in FIGS. 3 and 4, is the same as that shown in FIGS. 1 and 2 except hydraulic means is shown for raising and lowering the implement instead of the ratchet mechanism. Connected to tongue 25 is a fixed bracket 70 and a pivoted lever arm 71. The lever arm straddles tongue 25 and is swingable about a vertical axis. Interposed between the bracket 70 and the lever arm 71 is a hydraulic cylinder 72, including a shiftable piston rod 74. The hose connections from the tractor to cylinder 72 are not shown and are conventional. Lever 71 is so located that the forward end of spring 60 is connectable to it. When so connected and when the lever 71 is pivoted, cable 48 is either pulled or released. This raises or lowers the header 12. It will be noticed that regardless of whether the ratchet mechanism 54 is employed or the hydraulic cylinders 72, the spring 60 is effective as described.

It sometimes happens, that the tractor operator, when using cylinder 72, wishes to disconnect the tractor from the implement and use the tractor for some other operation and leave the header on the machine and in an elevated position. This requires that the connection of the tractor to the hydraulic cylinder 72 be removed. To enable such removal and still not have the header 12 lowered, a latch 75 is provided and pivotally mounted on the tongue 25. When the header is in elevated position, the lever arm 71 is as shown in FIG. 4. In such position, the hook 76 of the latch 75 is engageable with the lever arm to hold it in such position. When so engaged, the hydraulic connections to the cylinder 72 can be removed and the implement will nevertheless be held in elevated position.

As will be seen from FIG. 3, when the structure employed is hydraulic, the low silhouette of the machine is not impaired. Even when the ratchet mechanism is used, the operative components of the lift mechanism which are common to the ratchet mechanism or the hydraulic means, extend alongside tongue 25 or below it. The only upstanding structure is at the forward end of the tongue 25 where the stand 55 projects upwardly. Such stand is adjacent the tractor operator where it is fully accessible and out of the way of the operating mechanism of the implement. Such structure in no way impairs access to the other components of the implement.

The structure described is relatively simple and inexpensive both in manufacture and repair. The stop 61 prevents the implement 11 from pivoting rearwardly if the header is removed and also provides an upper limit for lifting of the header unit. Also, when the header is removed, it provides an easy means for adjusting the base unit to proper position to accommodate a header to be mounted thereon. Although the springs 59 and 60 have particular utility in the particular frame, tongue arrangement shown in the drawings, they obviously have utility in other harvester designs.

While this invention has been described in connection with two embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for adjusting a ground engageable implement relative to a wheel supported frame on which it is mounted and about a transverse axis relative to the direction of travel of the frame whereby a forward portion of the implement may be raised and lowered relative to the ground and relative to a forward projecting tongue of the frame, comprising a transverse rock-shaft on said frame to which said implement is fixedly connected whereby when the rock-shaft is pivoted in one direction said implement forward end is raised and when pivoted in an opposite direction the implement forward end is lowered, a counterbalance spring connected between said frame and rock-shaft and operating to assist pivotal movement of the rock-shaft in said one direction, a lever having one end fixedly connected to said shaft and extending forwardly thereof alongside said tongue to an opposite end, a support pulley on said tongue and above said lever opposite end, a flexible control element connected to said lever and extending upwardly therefrom, over said pulley member and then forwardly, mechanism on said tongue to operate said control element, means connecting said mechanism to said control element including a tension spring, said control element being adapted to be pulled forwardly through said tension spring to lift said lever and thereby pivot said rock-shaft in said one direction and released to allow the rock-shaft to pivot in the opposite direction, and a stop carried on said frame and engageable with said lever to limit upward movement of the lever and thus pivotal movement of said rock-shaft in said one direction.

2. A device as recited in claim 1 wherein said flexible control element comprises a cable.

3. A device as recited in claim 1 wherein said control element operating mechanism comprises a hydraulically operated lever arm and a ratchet operated lift arm, said control element being connectable, selectively, to one of said arms.

4. A device as recited in claim 3 wherein a latch is provided for connecting said lever arm to said frame when the lever arm is in a given position.

5. A device as recited in claim 1 wherein said control element operating mechanism comprises a ratchet operated lift arm movable downwardly to lower said header and upwardly to lift it, and a spring connected to said lift arm and operative to store energy on downward movement of the lift arm, said energy being usable subsequently to aid in lifting said lift arm.

References Cited in the file of this patent
UNITED STATES PATENTS

| | | | |
|---|---|---|---|
| 560,057 | Burmeister | May 12, | 1896 |
| 1,467,375 | Hagadome | Sept. 11, | 1923 |
| 2,196,645 | Saiberlich | Apr. 9, | 1940 |
| 2,499,500 | Hill et al. | Mar. 7, | 1950 |
| 2,720,744 | Ashton et al. | Oct. 18, | 1955 |
| 2,850,863 | Pierson | Sept. 9, | 1958 |
| 2,984,498 | Dewald | May 16, | 1961 |